United States Patent Office 3,287,257
Patented Nov. 22, 1966

3,287,257
ACTIVATION OF HYDROCARBON CONVERSION CATALYSTS EMPLOYED IN THE HYDROCRACKING OF HYDROCARBONS
Rowland C. Hansford, Yorba Linda, and Robert H. Hass, Fullerton, Calif., assignors to Union Oil Company of California, Los Angeles, Calif., a corporation of California
No Drawing. Filed Aug. 18, 1964, Ser. No. 390,455
12 Claims. (Cl. 208—111)

This invention relates to the catalytic conversion of hydrocarbons, particularly the hydrocracking of high-boiling hydrocarbon to produce therefrom lower boiling hydrocarbons, boiling for example in the gasoline range. The invention is directed specifically to novel methods for activating and/or regenerating a certain class of hydroconversion catalysts comprising a crystalline, zeolitic, molecular sieve base, upon which is deposited, preferably by ion-exchange, a Group VIII noble metal hydrogenating component.

To maintain maximum hydrogenating activity in such catalysts, the noble metal should be maintained in a finely subdivided state, such that the average particle size is less than about 50 A. in diameter, and preferably less than about 20 A. It has previously been found that noble metal-zeolite catalysts of this nature, in their oxidized state, are susceptible to damage when they are contacted with water or steam at temperatures above about 400° F., and this damage has now definitely been established as being due primarily to the agglomeration of noble metal into large crystallites of average diameter in excess of about 50 A. Even more severe agglomeration can occur if the initial catalyst, with the noble metal present as zeolitic cation, is reduced with hydrogen prior to the normal stabilization and activation by oxidative calcination. It has now been found however that effective redispersion of the noble metal into particles of average diameter less than about 30 A. can be obtained, if the agglomerated catalyst is first sulfided with hydrogen sulfide, and then oxidized at relatively high temperatures. It has further been found that this desired redispersion can be greatly accelerated if the high-temperature oxidation is carried out with slightly moist oxidizing gases, such that the partial pressure of water vapor is between about 0.005 and 0.5 p.s.i.a.

In the zeolite catalysts of this invention wherein the noble metal hydrogenating component is added thereto by ion exchange, the noble metal is, at least in theory, distributed on the zeolite in substantially a state of monoatomic subdivision, and thus presents a maximum ratio of surface area to mass. Agglomeration of the zeolitic noble metal into crystallites of average diameter greater than about 50 A. brings about a marked reduction in effective surface area thereof, with resultant decrease in hydrogenation activity. This decrease in hydrogenation activity not only reduces the overall hydrogenating activity of the catalyst, but also increases the rate at which the catalyst becomes deactivated in use due to the formation of carbonaceous deposits. It is therefore highly desirable to maintain the noble metal component in a finely subdivided condition, such that the average crystallite size is below 50 A., and preferably below about 20 A.

Agglomeration of noble metal on zeolite supports has been found to be a most troublesome problem when the catalyst, in an oxidized state, comes in contact with water at temperatures above about 400° F., and most markedly at temperatures between about 500°–900° F. When the water vapor partial pressure is below about 0.5 p.s.i.a., the rate of agglomeration is very slow, and under the conditions hereinafter described, certain minimal partial pressures of water vapor actually appear to aid in redispersing the agglomerated noble metal. Deleterious contact with water vapor at partial pressures above about 0.5 p.s.i.a., with resultant marked agglomeration, ordinarily comes about in one of two ways:

Firstly, in the preparation of the catalysts, following the final addition of the Group VIII noble metal hydrogenating component from aqueous solutions thereof, the catalyst is subjected to a drying and air-calcining operation wherein water vapor may be present at temperatures between 400°–900° F. During calcining, the noble metal is coverted to an oxide form. The resulting catalysts display a lower hydrocracking activity than could have been obtained had the catalysts been carefully dried at temperatures below about 400° F. before completing the calcining. Secondly, during conventional regeneration of the catalysts by oxidative combustion, considerable amounts of steam may be present in the regeneration gases or may be generated by combustion of hydrocarbonaceous deposits on the catalyst, and there will be resulting damage to the catalyst, particularly at regeneration temperatures of about 500–900° F. The process of this invention is designed primarily to repair the damage undergone by the catalysts in either of these two treatments, but is applicable in any other instance where the noble metal has become agglomerated into crystallites in the 30–200 A. size range or greater.

It is therefore a principal object of this invention to provide methods for redispersing agglomerated noble metal on zeolite catalysts so as to attain maximum activity and catalyst life. A further object is to provide methods for regenerating the catalysts here concerned so as to restore their fresh activity to a greater extent than has heretofore been possible. The overall objective is to extend the total active life of such catalysts and to obtain the most efficient use thereof during their total life span. Other objectives will be apparent from the detailed description which follows.

In copending application, Serial No. 230,718, filed October 15, 1962, a method is described for activating the catalysts of this invention, which method also involves redispersing agglomerated noble metals. The described method involves a series of alternating oxidations with intervening hydrogen reduction treatments, all of which are carried out at high temperatures and for extended periods of time. This treatment is effective, but is expensive and time-consuming, requiring at least about 48 hours for maximum effect. Effective redispersion by the methods of the present invention can be achieved in much shorter times of, e.g., about 1–4 hours. This is a factor of considerable importance in commercial operations, for each day of plant shut-down may involve a loss of several thousand dollars. Moreover, in most cases, the process of this invention provides a more complete redispersion of the noble metal than is obtainable by the methods described in the aforesaid application.

The correlation between activity and degree of metal agglomeration in the catalysts of this invention has been established by numerous electron photomicrograph and X-ray diffraction studies. Electron photomicrographs have established qualitatively that when any substantial proportion of the noble metal is present as agglomerates of 50 A. diameter or greater, the hydrogenation and hydrocracking activity of such catalysts is very low, and that where the agglomerates are less than about 10–20 A. in diameter, the catalysts are much more active.

For a more quantitative determination of percent agglomeration, and average agglomerate size, an X-ray diffraction analysis method has been developed which appears to be accurate within about ±25%. The first problem encountered in X-ray diffraction studies was the interference of the crystalline zeolite diffraction lines with the noble metal diffraction lines. It was found that this problem could be solved by treating the powdered catalyst sample with a relatively weak acid such as phosphoric or formic, whereby the crystallinity of the zeolite base is destroyed without affecting the size of the noble metal crystallites. The complete test procedure involves first reducing the catalyst in hydrogen for one hour at 700° F. and atmospheric pressure, purging with nitrogen, grinding to a fine powder, soaking the powder in dilute phosphoric acid for about one hour, separating and washing the powder, and drying at about 100° C. The dried powder is then reslurried with water, placed on a glass slide and dried for X-ray examination. Exemplary X-ray examination conditions for Pd-containing catalysts are as follows:

X-ray generator _____ CuK$\alpha$, Ni-filtered radiation, 60 kv.–16 ma.
Goniometer _____ 1°—MR—0.1° slits; 0.2 or 0.1°/min. angular speed.
X-ray detector _____ Scintillation counter; $HV$=1030 volts; $E$=1.25 x 10 volts; $\Delta E$=2.00 x 5 volts.
Ratemeter: 100 c.p.s. full scale—12 sec. time constant, or 50 c.p.s. full scale—24 sec. time constant.
Recorder _____ Speed, 7½ or 3¾ in./hr. (to match goniometer).
Scan _____ 38 to 42°=2$\theta$.

If the catalyst contains any significant proportion of palladium agglomerates of about 30 A. in diameter or greater, the analysis described gives an X-ray record having a major palladium peak at about 40.1°=2$\theta$. Smaller agglomerates are not detectable by X-ray diffraction. The area under the palladium peak at 40.1°=2$\theta$ is proportional to the concentration of palladium agglomerates of above about 30 A. in diameter. A standard reference catalyst representing 100% agglomeration was selected, which catalyst had been found to be substantially completely inactive for hydrocracking as a result for palladium agglomeration. By comparing the area under the aforesaid palladium peak on the X-ray record of the reference catalyst with the corresponding palladium peak area of other less completely agglomerated catalysts (containing the same weight proportion of palladium), the percent agglomeration in the test catalyst can be readily estimated. Average particle size of the agglomerates is calculated from the peak width at half height in the conventional manner.

The redispersion technique of this invention is preferably utilized at any time when X-ray analysis indicates that a significant proportion, usually about 25% or more, of the noble metal has become agglomerated. This will vary depending upon the original noble metal content of the catalyst, but normally it is uneconomical to employ more than about 1–2% by weight of noble metal. It is preferred that substantially all water and hydrocarbonaceous deposits be removed from the catalyst before the initial sulfiding step is performed, but these are not essential requirements if, during the subsequent oxidation step, care is taken to maintain the water vapor partial pressure below about 0.5 p.s.i.a. It is also preferred, though not essential, that the catalyst be pre-reduced in hydrogen before the sulfiding step in order to avoid water formation during conversion of metal oxides to metal sulfides.

The sulfiding step is normally performed at atmospheric pressures, but subatmospheric or superatmospheric pressures may be employed if desired. Suitable sulfiding temperatures range from about 80° F. up to about 1000° F., with the preferred range being between about 500° and 800° F. If lower temperatures are initially employed, it is preferred that the sulfiding at least terminate in the temperature range above about 500° F. in order to assure maximum removal of water. The preferred sulfiding agent is hydrogen sulfide mixed with hydrogen, or suitable inert gases, in proportions ranging between about 1% and 20% by volume but other suitable sulfiding agents such as mercaptans, carbon disulfide, thiophenes, etc. may also be employed in admixture with hydrogen. Mixtures of hydrocarbons and sulfur compounds may also be utilized in admixture with hydrogen. Sulfiding can normally be completed in periods from about 15 minutes to 1 hour or more, depending upon the facilities available.

Following the sulfiding operation, excess hydrogen sulfide is flushed from the reactor with inert gases such as nitrogen or the like and the catalyst bed temperature is adjusted to the initial desired oxidation temperature. Ordinarily, undiluted air may be employed for the oxidation at atmospheric pressures, though subatmospheric or superatmospheric pressures may also be employed. Suitable oxidation temperatures lie in the range of about 600° to 1200° F., preferably about 800–1100° F. In cases where carbonaceous deposits are present, or in the case of catalysts containing relatively large amounts of metal sulfide, it may be desirable to employ initially more dilute oxygen-containing gases, and/or to initiate the oxidation at relatively low temperatures, going to higher temperatures for completion. These precautions are to avoid exothermic heat rises which may raise the catalyst bed temperature above about 1200° F. Depending upon the gas flow rates and other factors, a suitably complete oxidation is normally obtainable in time ranges of about 15 minutes to 12 hours.

It has been observed that in cases where the oxidation gases are completely dry, a considerably longer oxidation time is required to achieve maximum redispersion. Completely dry air used for 12 hours at 920° F. in one instance was found to give an incompletely redispersed catalyst, whereas complete redispersion (0% agglomeration as above defined) was obtained in 1 hour using air containing about 0.25 volume-percent (0.037 p.s.i.a. partial pressure) of water vapor. It is therefore preferred that the oxidation be carried out in an atmosphere containing at least about 0.005, but not more than about 0.5 p.s.i.a. partial pressure of water vapor. The preferred partial pressures lie in the range of 0.01 to 0.25 p.s.i.a.

Following the oxidation treatment, the catalyst is normally flushed with an inert gas such as nitrogen or flue gases, reduced in hydrogen at temperatures of about 700–1000° F., and is then in suitable activated state for use in hydrocracking or other hydrocarbon conversions. Other hydrocarbon conversions contemplated herein include for example hydrogenation of olefins, hydrogenation of aromatic hydrocarbons, isomerization of normal paraffins to isoparaffins, isomerization of alkyl aromatics, transalkylation reactions, dealkylation of alkyl aromatics, etc. These processes are all performed under substantially conventional conditions known in the art.

In hydrocracking operations, suitable feedstocks may comprise light or heavy gas oils, heavy naphthas, cycle oils from catalytic operations, or substantially any mineral oil fraction boiling above about 100° F. and up to about 1000° F. Suitable hydrocracking conditions fall within the following ranges:

|  | Operative | Preferred |
| --- | --- | --- |
| Temperature, ° F | 400–850 | 500–750 |
| Pressure, p.s.i.g | 300–5,000 | 750–2,000 |
| LHSV | 0.1–10 | 0.5–5 |
| H$_2$/oil ratio, s.c.f./b | 1,000–15,000 | 2,000–10,000 |

Depending upon the severity of the hydrocracking conditions, and the refractoriness of the feed, it will be observed that the activity of the catalyst will have declined considerably after a period of time ranging between a few hours to several months. When the activity has declined to an uneconomic level, the flow of feedstock is terminated, and the catalyst is regenerated.

Regeneration may be carried out under substantially conventional conditions by passing dilute oxygen-containing gases through the catalyst bed at inlet temperatures of, e.g., about 700–950° F., and at atmospheric pressures or thereabouts. Where the partial pressure of water vapor during regeneration is not carefully controlled as described above, so that agglomeration of the noble metals occurs, the regenerated catalyst is then subjected to the redispersion technique described above before resuming the hydrocracking operation.

The catalysts of this invention are composed of a major proportion of a dehydrated, zeolitic, crystalline molecular sieve base, upon which is deposited a minor proportion of a Group VIII noble metal hydrogenating component. The molecular sieve bases are composed substantially exclusively of silica, alumina and one or more exchangeable zeolitic cations such as hydrogen, sodium, magnesium, calcium, etc. They are further characterized by relatively uniform crystal pores having a diameter between about 4 and 14 A. Various crystal forms of such molecular sieves are now available and suitable for use herein, e.g., those of the "X," "Y" or "L" crystal types may be employed. Natural or synthetic mordenite, chabazite, or other naturally occurring zeolites may also be employed.

It is preferred to employ molecular sieves having a relatively high $SiO_2/Al_2O_3$ mole-ratio, e.g., between about 3.0 and 10. The most active forms for hydrocracking, isomerization, or other acid-catalyzed conversions, are those wherein the exchangeable zeolitic cations are hydrogen and/or a divalent metal such as magnesium, calcium or zinc. In particular, the Y molecular sieves having crystal pore diameters of about 8–11 A., and wherein the $SiO_2/Al_2O_3$ mole-ratio is about 4–6, are preferred, either in their hydrogen form, or a divalent metal form, preferably magnesium. Normally, such molecular sieves are prepared first in the sodium or potassium form, and the monovalent metal is ion-exchanged out with a divalent metal, or where the hydrogen form is desired, with an ammonium salt followed by heating to decompose the zeolitic ammonium ion and leave a hydrogen ion. This heating of the ammonium zeolite may also bring about some degree of "decationization," producing a cation-deficient catalyst which is also active for hydrocarbon conversions. Zeolites of this nature are more particularly described in Belgian Patents Nos. 598,582, 598,682, 598,-683 and 598,686, and U.S. Patent Nos. 3,130,006 and 3,130,007.

For hydrocarbon conversions which do not require an acid function, such as hydrogenation or hydrodealkylation, the zeolitic cations of the molecular sieve base may comprise alkali metals, alkaline earth metals, or heavy metals of the transition series.

The foregoing zeolite bases are compounded, as by impregnation, with from about 0.1% to 5% (weight-percent based on free metal) of a Group VIII noble metal hydrogenating component, i.e., platinum, palladium, rhodium, iridium, ruthenium or osmium, or any combination thereof. The metals platinum, palladium and rhodium are preferred, and it is further preferred that such metals be added to the base by ion exchange. This can be accomplished by digesting the zeolite with an aqueous solution of a suitable compound of the desired hydrogenating metal wherein the metal is present in a cationic form, and then reducing to form the free metal, as described for example in Belgian Patent No. 598,686.

The following examples are cited to illustrate certain critical aspects of the invention, but are not to be construed as limiting in scope.

*Example I*

This example illustrates the correlation between noble metal agglomeration and hydrocracking activity. Two catalysts were prepared, each containing 0.5 weight-percent palladium deposited by ion exchange upon an ammonium zeolite of the Y molecular sieve type having a silica/alumina mole-ratio of about 4.7. Catalyst A (agglomerated) was prepared by reducing a portion of the palladium-ammonium-zeolite in hydrogen at 900° F., a technique known to cause maximum agglomeration of palladium (if not preceded by a stabilizing air calcination). Catalyst B (non-agglomerated) was prepared in the same manner as Catalyst A except that the palladium-ammonium-zeolite was activated by calcining in dry air at 950° F. for 12 hours, with air circulating constantly through the catalyst bed so as to minimize water vapor partial pressure.

Catalysts A and B were subjected to X-ray diffraction analysis as described above, and Catalyst A gave the largest diffraction peak at $40.1=2\theta$ of any of a large number of similar catalysts which were analyzed, and the average particle size was estimated to be about 115 A. Catalyst B showed no detectable diffraction peak for palladium, indicating the absence of agglomerates of greater than about 30 A. diameter.

Catalyst B was tested for hydrocracking activity at 1500 p.s.i.g., 1.5 LHSV and using 10,000 s.c.f./b. of hydrogen, using a substantially sulfur- and nitrogen-free gas oil feedstock boiling between about 400–850° F. Under these hydrocracking conditions a 50 volume-percent conversion to 400° F. end-point gasoline was obtainable at temperatures of 520–530° F. Catalyst A on the other hand, when tested under the same conditions, required a temperature above 800° F. to give 50% conversion. This latter result indicates substantially zero hydrocracking activity, and hence the large area under the palladium diffraction peak was taken to represent substantially 100% agglomeration. Catalyst A was hence adopted as a reference standard for evaluating degree of agglomeration in the catalysts employed in the following examples.

*Example II*

Another Catalyst, C, also containing 0.5 weight-percent palladium deposited upon the same type of Y molecular sieve zeolite employed in Example I, was prepared in the same manner at Catalyst B, except that during the activation treatment with air at 950° F., the partial pressure of water vapor was less carefully controlled, and the resulting catalyst was found to have a substantially lower hydrocracking activity than Catalyst B. X-ray diffraction analysis of this catalyst showed about 50% agglomeration (in reference to Catalyst A), and the average particle size of the palladium was 100 A. A portion of Catalyst C was subjected to further calcining in dry air at 920° F. for 12 hours, and the resulting catalyst still showed about 45% agglomeration with an average particle size of about 85 A.

*Example III*

Another portion of Catalyst C (50% agglomerated) was sulfided at 700° F. with a 3% hydrogen sulfide—97% hydrogen gas stream. The sulfided catalyst was then cooled to room temperature, and oxidized in a circulating stream of dry air (dew point below −40° F.) at 920° F. for 12 hours at atmospheric pressure. X-ray diffraction analysis showed that the resulting catalyst was only 16% agglomerated, and the average particle size was 120 A. The larger average size of these particles indicates that the sulfiding-oxidation treatment effects redispersion preferentially of the smaller agglomerates. This catalyst displayed substantially higher hydrocracking activity than Catalyst C.

*Example IV*

Another portion of Catalyst C was subjected to the sulfiding treatment described in Example III, and then was oxidized in slightly moist air containing about 0.25 volume-percent water vapor at 920° F. for 1 hour only at atmospheric pressure. Despite the shorter oxidation time, the resulting catalyst showed no detectable palladium agglomeration by X-ray diffraction analysis, indicating that substantially all the palladium was in the form of particles below about 30 A. in diameter. This catalyst also displays substantially higher hydrocracking activity than does Catalyst C.

Results analogous to those described in the foregoing examples are obtained when other catalysts, sulfiding treatments and oxidation treatments within the purview of the foregoing description are employed. It is therefore not intended that the invention be limited to the details described above, but broadly as defined in the following claims:

We claim:

1. A method for reactivating a hydrogenation catalyst comprising a minor proportion of a Group VIII noble metal deposited upon a crystalline molecular sieve zeolite base, wherein a substantial proportion of said noble metal is in the form of agglomerates of greater than about 30 A. diameter, which comprises subjecting said catalyst to a sulfiding treatment by contact with a gaseous sulfiding agent containing hydrogen sulfide at temperatures which, for at least the terminal portion of the contacting, are above about 500° F. and then subjecting the sulfided catalyst to oxidation at elevated temperatures between about 600° and 1200° F. in the presence of an oxygen-containing gas stream wherein the partial pressure of water vapor is no greater than about 0.5 p.s.i.a.

2. A method as defined in claim 1 wherein said Group VIII noble metal is palladium.

3. A method as defined in claim 1 wherein said molecular sieve zeolite base comprises zeolitic cations selected from the class consisting of hydrogen and divalent metals, and possesses substantial cracking activity.

4. A method as defined in claim 1 wherein said molecular sieve zeolite base in an alumino-silicate having a $SiO_2/Al_2O_3$ mole-ratio between about 3 and 10, and wherein the zeolitic cations therein comprises a substantial proportion of hydrogen ions and/or divalent metal ions.

5. A method as defined in claim 1 wherein said oxidizing step is carried out using a gaseous oxidizing medium containing water vapor in proportions providing about 0.005 to 0.5 p.s.i.a. of water vapor partial pressure.

6. A hydrocracking process with intermittent catalyst regeneration and activation which comprises:

(1) contacting a high-boiling mineral oil feedstock plus added hydrogen with a hydrocracking catalyst at elevated temperatures and pressures to give a substantial conversion to lower boiling hydrocarbons, and continuing such contacting for an extended period of time until the catalyst is substantially deactivated by the deposition of carbonaceous deposits, said catalyst comprising a minor proportion of a Group VIII noble metal hydrogenating component deposited upon an alumino-silicate molecular sieve zeolite cracking base having a $SiO_2/Al_2O_3$ mole-ratio between about 3 and 10, and wherein the zeolitic cations thereof comprise hydrogen ions and/or divalent metal ions;

(2) subjecting the deactivated catalyst to oxidative regeneration at elevated temperatures to burn off carbonaceous deposits, employing oxidizing conditions such that at least a portion of the regeneration is carried out with a partial pressure of water vapor in excess of about 0.5 p.s.i.a., whereby a substantial agglomeration of said noble metal component occurs;

(3) subjecting the regenerated catalyst from step (2) to a sulfiding step by contact with a gaseous sulfiding agent at temperatures which, for at least the terminal portion of the contacting, are above about 500° F.

(4) subjecting the sulfided catalyst from step (3) to a second oxidation step in contact with oxygen-containing gases at elevated temperatures between about 600° and 1200° F. while maintaining the partial pressure of water vapor below about 0.5 p.s.i.a.;

(5) reducing the oxidized catalyst from step (4) with hydrogen at elevated temperatures; and (6) resuming said hydrocracking contacting step as defined in step (1) with the reduced catalyst from step (5).

7. A process as defined in claim 6 wherein said noble metal hydrogenating component is palladium.

8. A process as defined in claim 6 wherein said oxidation step (4) is carried out in the presence of minor amounts of water vapor, amounting to between about 0.005 and 0.5 p.s.i.a. partial pressure thereof.

9. A method for reactivating a hydrocracking catalyst comprising a minor proportion of a Group VIII noble metal hydrogenation component deposited upon an alumino-silicate molecular sieve zeolite cracking base having a $SiO_2/Al_2O_3$ mole-ratio between about 3 and 10 and wherein the zeolitic cations thereof comprise hydrogen ions and/or divalent metal ions, said catalyst having been partially deactivated by previous contact with water vapor at temperatures above 400° F. and at partial pressures thereof above about 0.5 p.s.i.a., with resultant agglomeration of noble metal, which comprises:

(1) contacting said partially deactivated catalyst with a gaseous sulfiding agent comprising hydrogen sulfide at temperatures between about 80° and 1000° F. for a sufficient length of time to effect substantially complete sulfiding thereof, at least the terminal portion of said contacting being carried out at temperatures above about 500° F; and (2) contacting the sulfided catalyst with an oxygen-containing gas having a water vapor partial pressure below about 0.5 p.s.i.a. at temperatures between about 600° and 1200° F. for at least about 15 minutes.

10. A method as defined in claim 9 wherein said noble metal hydrogenating component is palladium.

11. A method as defined in claim 9 wherein a partial pressure of water vapor of between about 0.005 and 0.25 p.s.i.a. is maintained during said oxidation step.

12. A process as defined in claim 9 wherein said molecular sieve zeolite is of the Y crystal type.

References Cited by the Examiner

UNITED STATES PATENTS

| | | | |
|---|---|---|---|
| 3,197,397 | 7/1965 | Wight et al. | 208—111 |
| 3,197,398 | 7/1965 | Young | 208—111 |
| 3,197,399 | 7/1965 | Wight et al. | 208—111 |

DELBERT E. GANTZ, *Primary Examiner.*

A. RIMENS, *Assistant Examiner.*